(12) United States Patent
Lopata

(10) Patent No.: US 7,460,929 B2
(45) Date of Patent: Dec. 2, 2008

(54) INTEGRATED CURRENT FAULT CONTROLLER

(75) Inventor: Douglas D. Lopata, Boyertown, PA (US)

(73) Assignee: Agere Systems Inc., Allentown, PA (US)

( * ) Notice: Subject to any disclaimer, the term of this patent is extended or adjusted under 35 U.S.C. 154(b) by 41 days.

(21) Appl. No.: 11/380,943

(22) Filed: May 1, 2006

(65) Prior Publication Data

US 2007/0255460 A1 Nov. 1, 2007

(51) Int. Cl.
*G05D 17/00* (2006.01)
(52) U.S. Cl. .......................... 700/292; 700/297; 361/1; 714/100
(58) Field of Classification Search .............. 700/292, 700/293, 297–299; 335/6, 18; 361/1, 42, 361/115; 714/100, 799
See application file for complete search history.

(56) References Cited

U.S. PATENT DOCUMENTS

| | | | | |
|---|---|---|---|---|
| 4,675,770 A * | 6/1987 | Johansson | ..................... | 361/18 |
| 6,008,971 A * | 12/1999 | Duba et al. | ................... | 361/64 |
| 6,127,882 A * | 10/2000 | Vargha et al. | ............... | 327/540 |
| 6,788,035 B2 * | 9/2004 | Bassett et al. | ............... | 323/272 |
| 7,236,338 B2 * | 6/2007 | Hale et al. | ..................... | 361/42 |
| 2005/0289373 A1* | 12/2005 | Chapuis et al. | ............. | 713/300 |
| 2006/0287838 A1* | 12/2006 | Qi et al. | ........................ | 702/57 |

* cited by examiner

*Primary Examiner*—Alexander J Kosowski
(74) *Attorney, Agent, or Firm*—Duane Morris LLP

(57) ABSTRACT

A fault monitoring and management system integrates a fault controller with the power load functions within the power management device of a battery operated system. Multiple input load lines allow the fault controller to diagnose and disable defective or faulty power load functions that draw current from the system supply or battery. In addition, the fault monitor allows the system to stay operational if the fault is non-catastrophic to the critical functions.

13 Claims, 3 Drawing Sheets

INTEGRATED CURRENT FAULT CONTROLLER

FIELD OF THE INVENTION

The invention concerns a fault monitoring and power contingency management system for portable battery-operated devices having multiple operational elements. A faulty circuit or subassembly is detected based on current loading conditions. The fault is isolated by decoupling one or more predetermined elements from the power supply, including the source of the fault. Decoupling the offending circuit or subassembly prevents damage and can enable continued operation of other functional elements in the device.

BACKGROUND

Certain portable battery-operated devices such as cellular telephones, personal digital assistants, cameras and media players, have multiple integrated functions. In addition to the functions that are directly involved in the nominal purpose of the unit, such as voice communications by a cellular telephone or recording image data by a digital camera, other functions of the device are supportive of the main function. Examples are battery chargers, status indication displays, audio annunciators, and the like. Still other functions are convenient combinations of diverse functions in one device. An example of a convenient combination is a cellular telephone capable of recording image data. The communications function of the device is useful to send the image data to another device for viewing or storage.

All of the functional elements and subassemblies comprise electrical loads on the power supply, typically comprising a battery. In different states of operation, particular loads might be active and sinking current or quiescent and drawing little or no current. Among these loads are devices and subassemblies such as application processors, battery chargers, camera modules, video processors, RF modems, network interface modules (e.g., Bluetooth), MP3 audio players and amplifiers, associated memories, input/output displays and switch interfaces, etc.

All of these functions are coupled directly or indirectly to the power supply, typically comprising one or more Lithium-Ion batteries. The different functional elements may require voltage regulation. Some functional elements require DC/DC converters and switched mode power supplies (SMPS) to boost the DC voltage level. Three or four different SMPS units may be provided in new cellular designs for driving diverse functions. As many as 27 different voltage outputs may be provided in 2.5G and 3G cellular devices. The current load on the battery regularly exceeds one amp in a Time Division Multiple Access (TDMA) system when actively operating in an RF communication mode. The various other supply voltages, many of which are regulated, service audio and RF digital transceiver functions and also accessory switch control, LED drivers, vibrator drivers, ringer drivers, and more. Any one or more of these functions can draw current in the range of 0.01 to 1 Amp.

Such units also typically include battery charging circuits. In that case, the battery becomes a current sink. Nevertheless, other functions remain subject to activation. The supply of regulated voltages and such current as demanded by the respective functions continues.

All told, the power supply of a multifunction portable device such as a cellular telephone might service 20 to 30 functions in which one or more of the functional subassemblies is active, and several may be active at once. In a worst case, the power supply (e.g., one 4.2V Lithium Ion battery cell) may need to provide as much as 2 to 3 Amps.

Some of the functions are served by switching elements, amplifiers and the like, provided on board one or a limited number of integrated circuits. These circuits typically include a digital processor and memory for operation as a controller. Some of the other functions are served as peripheral circuits under switched control of the processor.

With such a configuration involving a number of current loads, there is a possibility that from time to time some particular load may fail, or an operational state may be assumed wherein an inordinate current load is presented by one or more of the devices. However, the particular current level that should be considered inordinate for a given load or subset of loads may differ between different operational states of the device. It would be advantageous to provide a power management arrangement that is programmed or contains sufficient conditional logic that it can appropriately identify problems that may arise in various operational scenarios, and can act to ameliorate problems, perhaps by making power distribution changes under its control, or decoupling one or more selected loads (possibly including a defective load), or automatically triggering a change to a different operational state of the device.

A power supply management scheme could prevent loss of communications or keep the battery from discharging more quickly than necessary or otherwise allocate the available power supply capacity to high priority uses. The available power would then provide service to certain priority functions and to retract support for other functions that may be malfunctioning or are considered low priority under the circumstances. With the increasing number of additional functions being served in the latest multifunction portable devices, the possibility and complication of these problems present challenges.

Simple switching schemes for limiting damage in the event of component failure along a current supply path are known. These schemes include thermal threshold shutdown devices, current fold-back limiting, rectifiers, fuses and so forth. Current limiting circuits contained in voltage regulators can be arranged to switch the regulator current output off, or into a low-current-output condition, when current drawn by a load exceeds some instantaneous or time-integrated threshold. Such circuits also can be made to emit a signal or to activate an indicator in the event of such a fault. However, reliance on internal current limiters in voltage regulators is not an optimal solution in a device having multiple loads and varying operational states. For example, a current fault threshold for a current limiting regulator is generally set at the very highest level of current that might be drawn in any operational state, and shuts down the output when the level is exceeded. Such a regulator provides protection against self damage, but It would be advantageous to have a more adaptive way to react to conditions, perhaps monitoring current loading conditions for a group of loads and using different current fault thresholds for respective loads in different operational states. What is needed is a sophisticated way to detect and to respond appropriately to current loading conditions involving a plurality of loads and operational conditions. By sensitivity to varying conditions, loads and regulators can be protected and the device also can appropriately allocate available power to loads that are considered priority loads in the particular operational state of the device at the time.

Even if an offending load is readily identifiable, it would also be advantageous to react with due consideration for the nature of the load and not necessarily simply to disable the offending load while continuing to serve other loads. Loads may be related, and there may be no point in providing current to a load that depends on operation of some other load once the other load has been turned off. For example, it is not useful to disable a transceiver function in a cellular telephone, even in adverse low battery or high current draw circumstances, while continuing to serve the audio or digital data processing functions that collect or process information fed to or from the transceiver. Loads may have priorities, and it may be desirable to attempt to maintain ongoing operations at the expense of less important features. For example, it may be desirable to maintain communications over audio playback or image capture capabilities, even if it is the communications circuits that appear to be faulty or marginal.

In order for a portable device to be capable of power management, the power distribution arrangements need to be configured to permit separate monitoring and separate control of loads, and potentially also to distinguish between internal and external loads. Such configurations and the control of the configuration to appropriately allocate power in a multifunction device, are novel aspects of the present invention. A power distribution control is integrated with due regard to the complexity of a cellular telephone or similar device, so as to react appropriately to a current fault, to discriminate among more and less critical functions, and where possible to allow the cellular device to continue functioning. The invention mitigates the impact of a failure of non-critical functions on the critical functions of the device, and provides for appropriate allocation of power supply capacity. Furthermore, the invention comprises a diagnostic tool that is useful for troubleshooting, repair, and signaling or indicating the state of operational conditions to the user.

SUMMARY OF THE INVENTION

A novel power allocation and power fault controller is provided, especially for a multifunction portable device such as a cellular telephone and camera combination, or an MP3 player with data communications capability, etc. This power controller is arranged to monitor and distinguish among multiple functional load elements that are coupled to one or more power sources of the device. The power controller manages the portable device by sensing power availability and load conditions, potentially providing one or more fault indications, and allocating available power in a manner that ameliorates the adverse consequences of failure of particular load elements, reserving power for selected functions at the expense of others. The portable device is configured to provide distinct power distribution paths to multiple loads that otherwise might be arranged in parallel. The paths comprise current sense feedback to the power controller and switching or power limitation controls responsive to the power controller and/or to a supervisory system processor. The power controller and the system processor discriminate among the loads by function, power draw requirements and the like, versus the operational status of the portable device. In this way, loads can be monitored and isolated where necessary. Available power is allocated. Operations and use of power are varied to deal effectively with situations that arise.

The power management control function can be one of various functions of a main processor of the portable device. In an exemplary embodiment, however, the power fault detection and power control also rely in part on a dedicated power fault controller. The power controller receives load sensing signals such as threshold over-current indications, from a plurality of power load functional elements or subsets of two or more elements. The input signals to the power controller enable assessment of conditions and information needed to determine a course of action when a fault occurs. The controller provides a centralized manager that can evaluate the fault indicators. The controller can shut down the offending function (typically by decoupling from the supply but also potentially by limiting the current feed), and generates an interrupt and status report to the system processor. The system processor and/or the power fault controller determine a course of action.

Exemplary responsive actions may include recycling the offending function to attempt to reset the fault condition, changing the availability of services to eliminate a power fault condition or to redistribute available power, or sending an error message to the user or to a remote service technician. Non-critical functions can be disabled to deal with a load failure or to deal with particular power conditions. The reallocation of power supply capacity is tailored to reserve if possible the critical operations of the portable device (such as the ability of a cellular phone to place calls), and decisions about what operations shall or shall not be regarded as critical is made according to the programming of the fault controller and/or the device control processor, based on the system inputs and the sensed status of the various loads.

These and other aspects of the invention will be apparent to those skilled in the art in view of the following discussion and the appended claims.

BRIEF DESCRIPTION OF THE DRAWINGS

The foregoing will in part be obvious and in part be pointed out more fully hereinafter in connection with a written description of preferred embodiments of the present invention illustrated in the accompanying drawings in which.

DETAILED DESCRIPTION OF PREFERRED EMBODIMENTS

Figure 1:
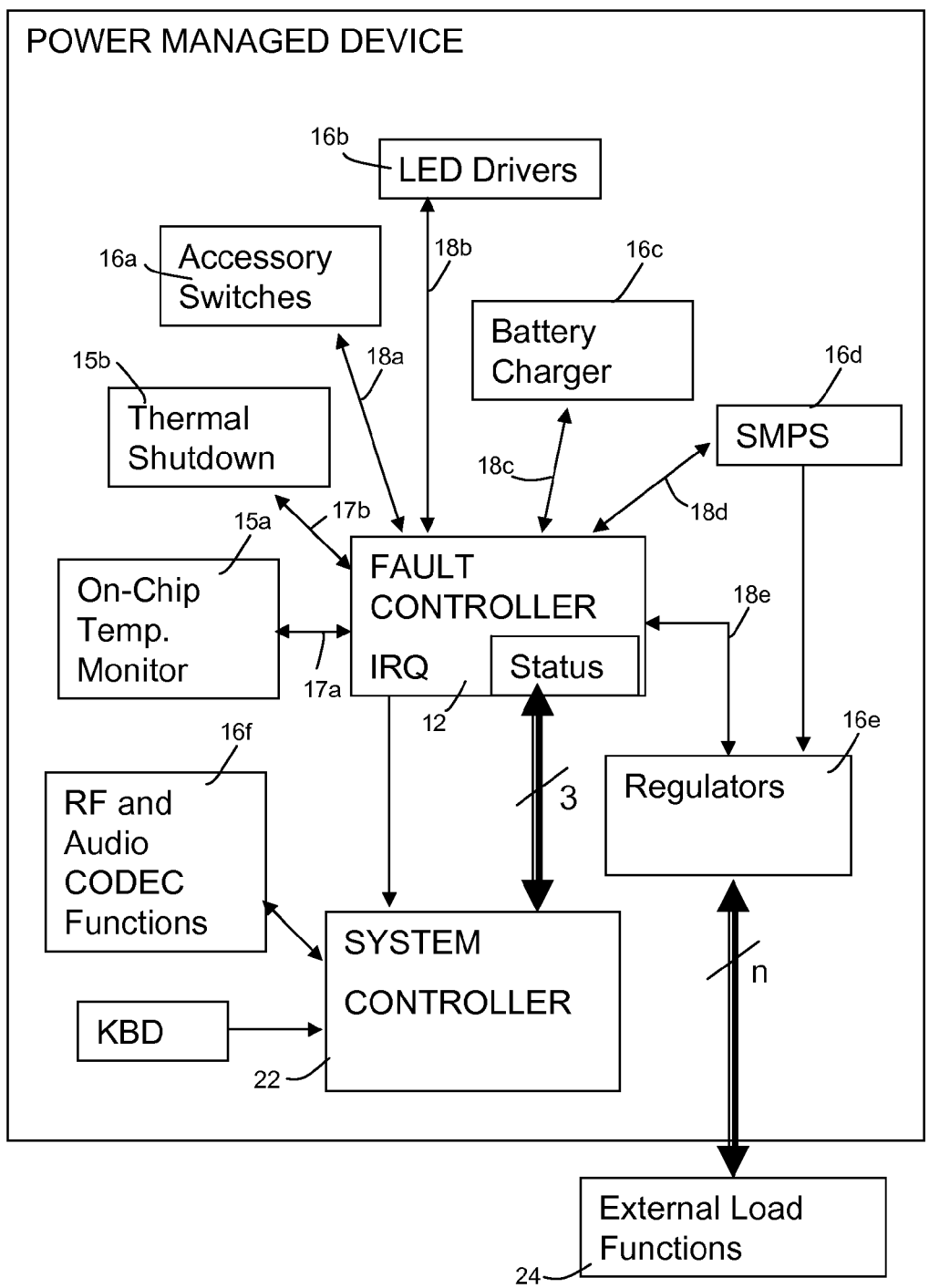
FIG. 1 is a schematic block diagram of the fault controller according to the invention.

FIG. 1 illustrates an exemplary battery operated system 10 implementing a fault controller 12 according to an aspect of the invention. The system is exemplified in a cellular telephone as shown by the illustration of RF and audio CODEC functions, but can also be embodied in other devices that have a plurality of loads. The loads are selectively activated, e.g., being switchably coupled to the power supply or alternatively being directly coupled to the power supply but switchable between more or less active versus quiescent states of operation. Subsets comprising one or more of the loads may be drawing current in a given operational scenario, whereas others of the loads may be inactive or decoupled from the power supply.

The apparatus comprises a power fault controller 12 that can comprise a processor or a series of gates, arranged to assess operational status and to report to a system controller 22. The power fault controller 12 can be coupled to a temperature monitor 15a for developing a fault indication signal, and a thermal shutdown element 15b via suitable signal lines 71a, 17b, respectively. In addition to such a thermal protection arrangement, the fault controller is coupled to a variety of elements 16a-16e, that sink or source current in different operational states.

The power managed device includes a program for operating the system controller 22 and input/output devices including manually operable switch inputs 16a and indicators such as LEDs coupled to drivers 16b are more or less directly coupled to the controller 22. Switching between operational states is partly a matter of a user's operation of a keyboard (KBD) and/or accessory switches 16a, and also is determined as a programmed matter by the system controller 22 in conjunction with inputs from the user and from signals received, e.g., from RF/Codec element 16e.

Some of the load devices are involved in primary functions of the device, such as communications in a cellular telephone embodiment requiring user operated switch selections, local display of information under control of the system controller 22, and remote signaling over the RF/Codec element. These functions can be accorded a higher priority than other functions, particularly in a low battery condition as determined by the battery charger element 16c and reported to the fault controller 12. The fault controller 12, either independently or in conjunction with signaling between the fault controller 12 and the system controller 22, determines the operational state and determine whether one or more loads will be decoupled so as to conserve battery power, to reduce the rate of discharge or otherwise to control power consumption.

Figure 2:
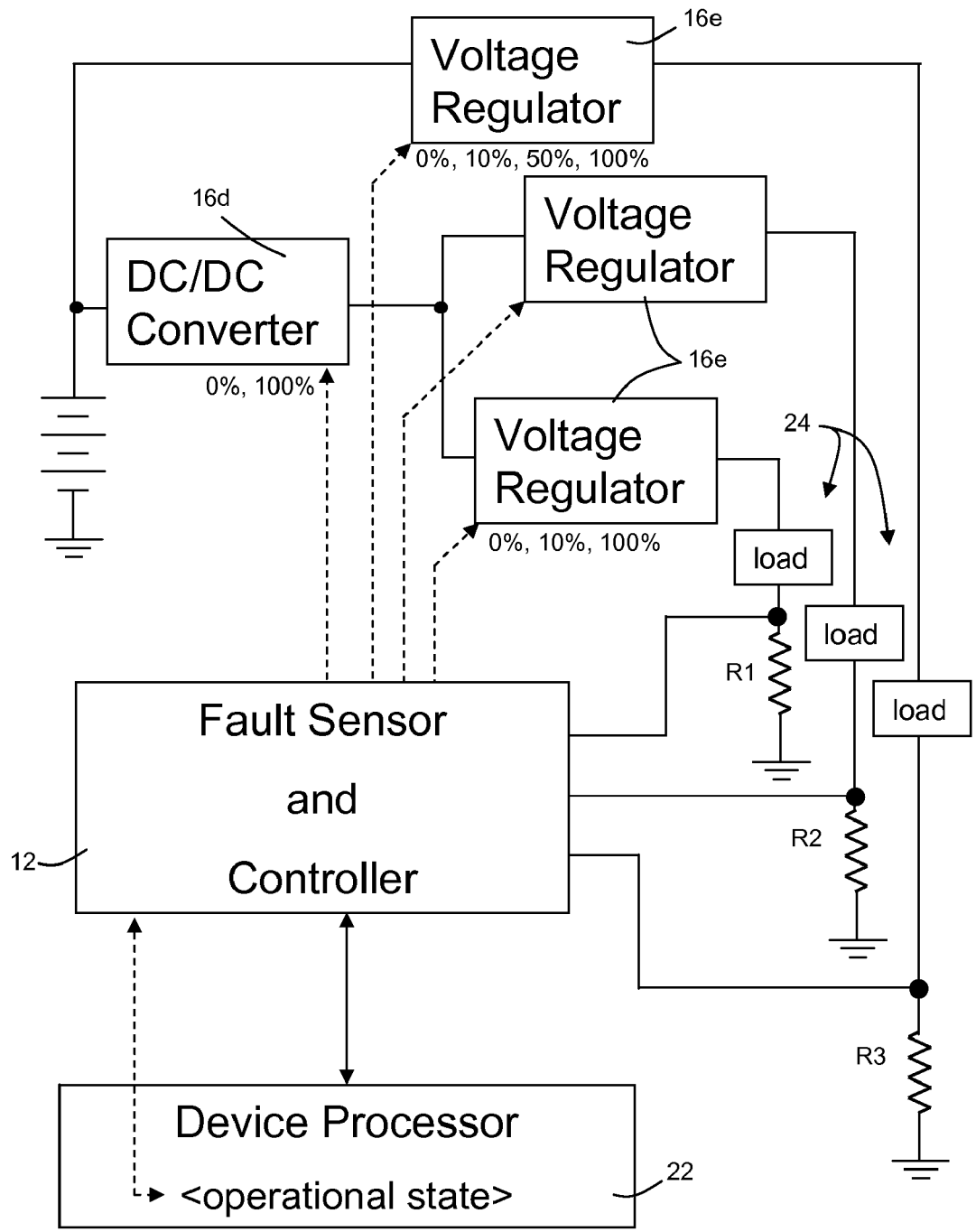
FIG. 2 is a schematic diagram illustrating further aspects of the invention as discussed below.

Throughout the drawings, the same or functionally comparable elements have been identified where possible using the same reference numbers. FIG. 2 shows a number of loads that have separate or shared regulators that are controlled by the fault controller for regulating the current from the basic power supply, namely a battery, to the respective loads. In connection with the example of a cellular telephone wherein the communication functions receive priority, the respective load functions 24 could be data storage and retrieval functions, clock and alarm functions, camera functions such as display, record picture, flash, audio record or playback, etc.

It is possible in a given state of operations that one or more of the functions advantageously can be disabled in favor of another function, either by programmed decision or by user selection among alternatives offered by a programmed process associated with the controller 22.

Battery operated system 10 in FIG. 1 comprises a power management device 14 having at least one fault status detector 15a-15b and a plurality of power loads 16a-16e. Examples that may be implemented as fault status detector 15 include an on-chip temperature monitor 15a and a thermal shutdown circuit 15b. Examples that may be implemented as power loads 16a-e include supply regulators, battery chargers, accessory switch control, one or more switched mode power supplies (SMPS), LED drivers, etc. Additional load functions that might advantageously be of limited priority can be, e.g., vibrator drivers, ringer drivers, camera modules, video processors, Bluetooth modules, MP3 audio players, etc.

A control and/or status signaling line 17a-17b electrically couples fault controller 12 to fault status detector 15a-15b, by which a fault status signal is sent from fault status detector 15 to fault controller 12. A plurality of input load lines 18a-18e electrically couple fault controller 12 to each of plurality of power load functions 16a-16e. Fault controller 12 accepts inputs from power load functions 16(a-e) by means of input load line 18(a-e).

When a fault occurs, monitoring circuits associated with power load functions 16(a-e) send an indication to fault controller 12 through input load lines 18(a-e). Fault controller 12 may also monitor each fault status detector 15 by polling for status. The monitoring circuits can comprise over-current and/or under-voltage threshold detectors (not shown) or similar devices for generating a signal under predetermined conditions related to current, voltage, temperature, elapsed time or other parameters.

For example, on-chip temperature monitor 15(a) transmits a temperature signal via fault status line 17a to fault controller 12, by which fault controller 12 can monitor the on-chip temperature as an early warning indicator. Generally, a rise in temperature on the device at a point adjacent to a power sourcing element is an indication of increased average current draw.

Thermal shutdown circuit 15b transmits a thermal shutdown signal via fault status line 17b to fault controller 12, by which fault controller 12 can be alerted of a potentially damaging short or other failure within system 10. Fault controller 12 can be comprised of a controller or a set of gates that are arranged to react to the severity of a fault by evaluating the fault indicators from plural load elements. The fault controller 12 also can react to other factors, including which function appears to be the source of the error, which functions are presently active, and whether the offending and active functions are critical or non-critical functions in view of the operative state of the battery operated system 10.

The fault controller can signal the system controller 22, which can be programmed to warn the user and/or to decline to initiate non-critical functions in predetermined operational states wherein a critical function may be adversely affected. In one aspect, the fault controller 12 can react to the severity of the fault, for example reacting to a potential short circuit current fault by decoupling an active load. The fault controller 12 can also be arranged to revise operations by suspending a function temporarily while another function proceeds. The fault controller 12 can determine a course of action either independently or together with signaling between the fault controller 12 and the system controller 22 as well as a user. User input can be prompted on the display drivers or by audio signaling and received over the accessory switch and/or KBD inputs.

Referring to FIG. 2, voltage regulators 16e for the various load functions can be more or less proximal to a battery power source or to the SMPS DC/DC inverter 16d. The current draw of loads can be determined by voltage threshold detection using current sense resistors R1-R3 or, although not shown in FIG. 2, using current replica repeaters built into the regulators themselves. The potential actions may include (without limitation) shutting down an offending load function 24, shutting down a regulator providing current to a function or controlling the regulator to decrease the current available, generating an interrupt or setting an appropriate status indication in a status register to provide information to controller 22 (which controller can be programmed to reconfigure permitted operations and/or power supply allocation.

According to one aspect, the fault controller can contain a nonvolatile status register containing plural bits (3 bits being shown to represent eight different values), or that power to the status register be maintained at least in the event of a dire condition such as high temperature cutoff (e.g., above 155 degrees F.) associated with one of the respective load functions 24. This allows for some diagnosis of the offending fault if the system recovers and the system supply has not been lost or discharged by the fault. Furthermore, the severity of the fault can also be gauged with the assistance of on-chip temperature monitor 15a if necessary (i.e. the chip is rapidly heating due to a fault somewhere in the system).

According to the foregoing description, it is an aspect of the invention that a portable device is made fault tolerant, particularly in the event of a high current draw by a particular load device. Although a single regulator might readily be provided with a switched output to snub high current conditions, the point of the invention is to provide a way to preprogram a considered response to a fault condition, including considerations for dealing most appropriately with the fault condition in view of operational status and the nature of the fault.

Figure 3:
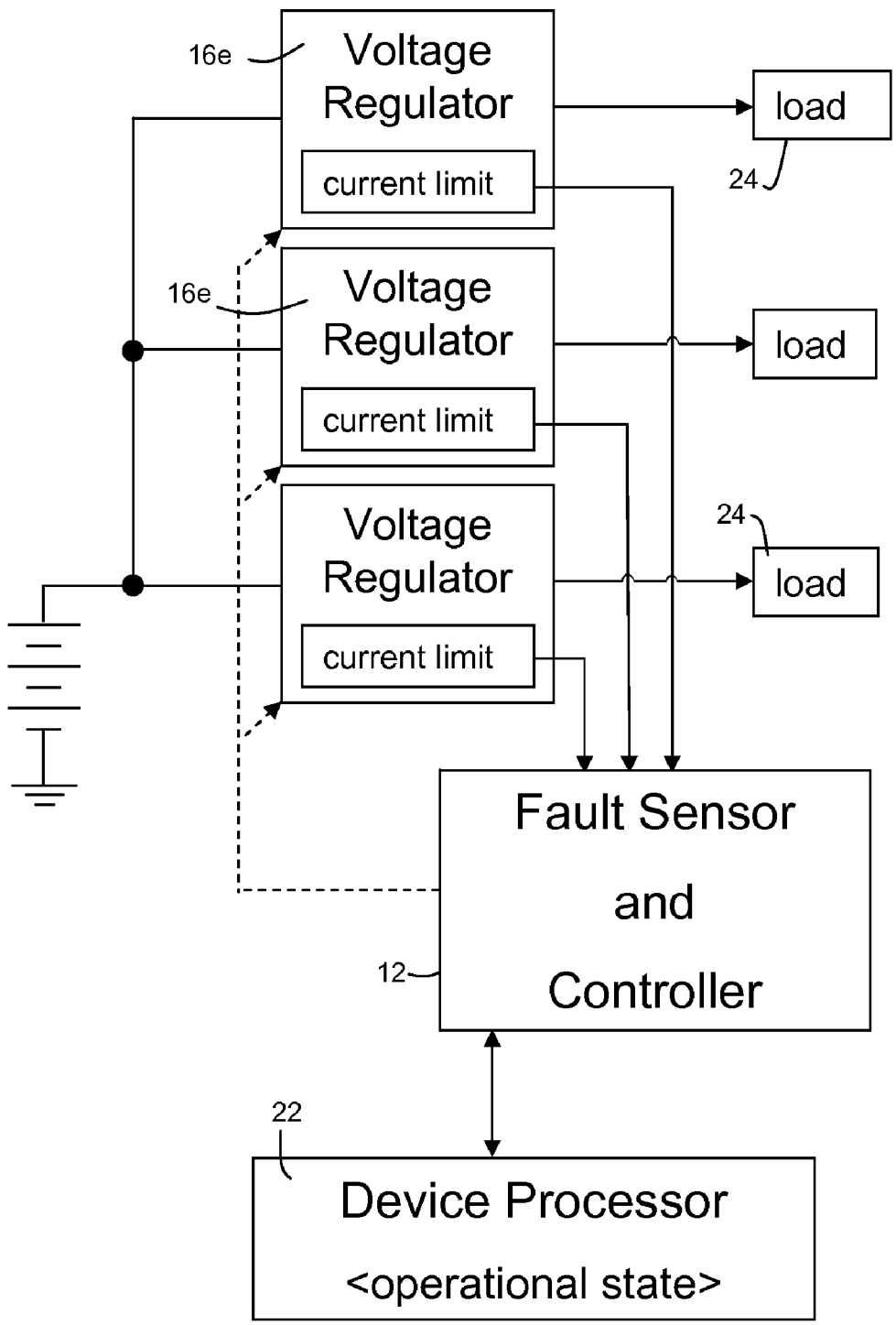
FIG. 3 is a block diagram illustrating an alternative embodiment that is similar to FIG. 2 but has voltage regulators with current-sense and/or current-limiting circuits included therein.

An alternative embodiment of the invention is shown in FIG. 3. This embodiment resembles FIG. 2 but as shown, the voltage regulators 16e are provided with internal current limit circuits. According to one aspect, the fault sensor and controller 12 as described above is arranged to receive current indication signals from the voltage regulators, for example a state signal from respective voltage regulators having at least two and potentially more different signal levels, from which the state of the particular regulator 16e can be surmised. The fault sensor has outputs coupled back to control the regulators 16e, as shown by the broken line in FIG. 3. This control preferably includes an ability to disable the output of the voltage regulator. According to one embodiment, the fault sensor also can be arranged to dictate one or more current threshold levels to the regulators 16e, e.g., with respect to instantaneous or average current draw. In that case, one way to disable the regulator 16e may be to set a very low current output threshold during an operational state wherein the respective load 24 would draw current if available. In this way, the fault sensor and controller can obtain control input information and generate control output signals that enable a relatively sophisticate set of operational states and current thresholds.

While considerable emphasis has been placed on the preferred embodiments of the invention illustrated and described herein, it will be appreciated that other embodiments can be made and that many changes can be made in the preferred embodiment without departing from the principles of the invention. Accordingly, it is to be distinctly understood that the foregoing descriptive matter is to be interpreted merely as illustrative of the invention and not as a limitation.

I claim:

1. A fault monitoring and management system comprising:
    a portable battery-operated device having a plurality of functional subassemblies that are selectively activated in different operational states of the device that are selected according to user control;
    a power management device having a plurality of power load functions, each of the plurality of power load functions having at least two states;
    a fault controller integrated on the power management device;
    a plurality of input load lines each having a first connection to one of the plurality of power load functions and a second connection to the fault controller for transmitting an input load signal from each of the plurality of power load functions to the fault controller; and,
    wherein the fault controller is programmed to assess load conditions from changes in the input load signal from said power load functions during one of the operational states, and the fault controller is programmed for switching at least a subset of the power load functions from a first load state to a second load state within said states of the power load functions, thereby switching to another of the operational states upon occurrence of a fault, and wherein switching to said another of the operational states is predetermined according to programming of the fault controller to preserve at least one of the power load functions while protecting the device from the fault.

2. The fault monitoring and management system of claim 1, wherein the fault controller is configured to at least reduce power supplied to a power load function associated with the fault, and while activating and deactivating others of the power load functions according to priority of the power load functions in view of the fault.

3. The fault monitoring and management system of claim 2, comprising a fault status detector with an on-chip temperature monitor, and wherein the fault status controller reacts to a fault status signal that varies due to temperature.

4. The fault monitoring and management system of claim 3, wherein the fault status detector comprises a thermal shutdown circuit.

5. The fault monitoring and management system of claim 1, wherein said at least two states comprise an on-state and an off-state.

6. The fault monitoring and management system of claim 5, wherein said at least two states further comprise a partially powered state.

7. The fault monitoring and management system of claim 1, wherein the load functions are chosen from the group consisting of cellular telephone communication functions, network data communications, data storage and retrieval functions, display, clock and alarm functions, vibration and ringer, camera photo record, camera flash, picture display, audio record and audio output.

8. The fault monitoring and managing system of claim 1, wherein the power loads comprise at least one of a supply regulator, a battery charger, an accessory switch control, a switched mode power supply and a display.

9. A method of monitoring and managing device faults comprising the steps of:
    providing a power management device for a portable battery-powered device and preprogramming the cower management device to define responses to fault conditions associated with one or more of a plurality of power load functions, by which the power management device at least partly disables programmably selected ones of the power load functions;
    operating the portable battery-powered device according to user inputs wherein a plurality of power load functions are activated in combinations to achieve operation in states selected by the user inputs;
    monitoring a plurality of the power load functions via the power management device, wherein each of the plurality of power load functions is electrically coupled to an over-current fault controller;
    receiving an over-current indication from at least one of the plurality of power load functions for alerting the fault controller that a fault has occurred;
    evaluating a state of operations in view of the fault according to said preprogramming of the power management device, and determining a course of action wherein selected ones of the power load functions can be enabled and disabled so as to protect the device from the fault while preserving at least one of the power load functions; and
    managing the system according to the course of action determined.

10. The method of monitoring and managing device faults of claim 9, further comprising the step of monitoring an on-chip temperature monitor.

11. The method of monitoring and managing device faults of claim 9, further comprising the steps of:
    monitoring a thermal shutdown circuit; and
    receiving a thermal shutdown signal from the thermal shutdown circuit.

12. The method of monitoring and managing device fault of claim 10, wherein the step of evaluating the system to determine a course of action includes gauging the severity of the fault with the assistance of the on-chip temperature monitor.

13. The method of monitoring and managing device faults of claim 9, wherein a course of action is selected from the group consisting of: shutting down an offending function, shutting down a source regulator, generating an interrupt, and setting an appropriate status indication in the status register.

* * * * *